(12) United States Patent
Sui et al.

(10) Patent No.: US 11,936,544 B2
(45) Date of Patent: Mar. 19, 2024

(54) USE OF CUSTOM RESOURCE DEFINITIONS FOR REPORTING NETWORK RESOURCE USAGE OF A NODE CLUSTER

(71) Applicant: VMware, Inc., Palo Alto, CA (US)

(72) Inventors: Jianwei Sui, Beijing (CN); Danting Liu, Beijing (CN); Donghai Han, Beijing (CN); Wenfeng Liu, Beijing (CN); Jianjun Shen, Redwood City, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/820,328

(22) Filed: Aug. 17, 2022

(65) Prior Publication Data
US 2024/0031265 A1 Jan. 25, 2024

(30) Foreign Application Priority Data
Jul. 20, 2022 (WO) ................ PCT/CN2022/106711

(51) Int. Cl.
*G06F 9/455* (2018.01)
*G06F 9/54* (2006.01)
*H04L 43/0876* (2022.01)

(52) U.S. Cl.
CPC ...... *H04L 43/0876* (2013.01); *G06F 9/45558* (2013.01); *G06F 9/547* (2013.01); *G06F 2009/45595* (2013.01)

(58) Field of Classification Search
CPC ... H04L 43/062; G06F 9/45558; G06F 9/547; G06F 2009/45595
See application file for complete search history.

(56) References Cited

U.S. PATENT DOCUMENTS

| | | | |
|---|---|---|---|
| 10,924,548 B1 * | 2/2021 | Karumbunathan | G06F 3/064 |
| 10,929,415 B1 * | 2/2021 | Shcherbakov | G06F 3/04842 |
| 2020/0174842 A1 * | 6/2020 | Wang | H04L 67/63 |
| 2021/0314388 A1 * | 10/2021 | Zhou | H04L 41/0895 |
| 2022/0038311 A1 * | 2/2022 | Shen | H04L 12/66 |
| 2022/0100879 A1 * | 3/2022 | Todd | G06F 16/2379 |
| 2022/0182439 A1 * | 6/2022 | Zhou | G06F 9/542 |
| 2022/0210035 A1 * | 6/2022 | Hendrickson | H04L 43/10 |
| 2022/0321495 A1 * | 10/2022 | Liu | H04L 41/065 |
| 2022/0400053 A1 * | 12/2022 | Liu | H04L 41/0876 |
| 2023/0063541 A1 * | 3/2023 | Mattar | G06F 3/0673 |
| 2023/0161643 A1 * | 5/2023 | Murray | G06F 9/50 719/328 |
| 2023/0231827 A1 * | 7/2023 | Tang | H04L 49/70 709/245 |
| 2023/0300002 A1 * | 9/2023 | Shen | G06F 9/45558 709/220 |

* cited by examiner

*Primary Examiner* — Kostas J Katsikis
(74) *Attorney, Agent, or Firm* — King Intellectual Asset Management (57) ABSTRACT

A system and method for capturing resource usage information in a network for namespaces in which pods operate are described herein. A data structure specifies a topology that includes a gateway and routing addresses in a network whose usage is to be captured. The data structure is provided to an API of a master node controlling the pods. A controller in the master node enforces the data structure and reports results back to the API.

20 Claims, 12 Drawing Sheets

NamespaceNetworkInfo Example

```
 1  metadata:                                                          702
 2      creationTimestamp: "2021-05-19T16:34:52Z"
 3      generation: 3
 4      name: sunnyvale
 5      resourceVersion: "9205374"
 6      selfLink:
/apia/vmware.com/v1alpha1/namespaces/sunnyvale,namespacenetworkinfo/sunnyvale
 7      uid: 08e9729-cdd-4031-8c98-704a17c7fdca
 8  topology:
 9      defaultEgressIP: 192.168.125.5
10      defaultIngressIP: null
11      gateway: t1_a16ba153-aa79-4581-9fb9-d6ec41f140c5_rtr
12      subnetCIDs:
13      - 10.241.0.0/25
14  usage:
15      egressCIDRUsage:
16      allocated: 2
17      total: 256
18      ingressCIDRUsage:
19      allocated: 3
20      total: 256
21      subnetCIDRUsage:
22      allocated: 16
23      total: 128
24  status:
25      conditions:
26      -LastUpdateTime: "2021-05-19T09:34:54Z"
27      Message: null
28      Reason: null
29      Status: "True"
30      type: GatewayReady
31      -LastUpdateTime: "2021-05-19T09:34:54Z"
32      Message: null
33      Reason: null
34      Status: "True"
35      type: LoadBalanceReady
36      -LastUpdateTime: "2021-05-19T09:34_54Z"
37      Message: null
38      Reason: null
39      Status: "True"
40      type: NetworkConfigCompleted
```

FIG. 7

ClusterNetworkInfo Example

```
1  kind: CustomNetInfo                                                      802
2  metadata:
3      creationTimeStamp: "2021-05-19T16:34:52Z"
4      generation: 1
5      name: domain-c8-k8scluster
6      resourceVersion: "8205363"
7      selfLink: /apis/vmware.com/v1alpha1/clusternetworkinfos/domain-c8-
k8scluster
8      uid: 14755f90-a681-4ba1-96ae-a27e75abc615
9  status:
10     conditions:
11     - LastUpdateTime: "2021-05-19T09:34:52Z"
12     Message: null
13     Reason: null
14     Status: "True"
15     type: GatewayReady
16     - LastUpdateTime: "2021-05-19T09:34:52Z"
17     Message: null
18     Reason: null
19     Status: "True"
20     type: LoadBalancerReady
21     - LastUpdateTime: "2021-05-19T09:34:52Z"
22     Message: null
23     Reason: null
24     Status: "True"
25     type: NetworkConfigCompleted
26  topology:
27     egressCIDRs:
28     - 192.168.125.0/24
29     gateway: domain-c8:k8scluster
30     ingressCIDRs:
31     - 192.168.126.0/24
32     subnetCIDRs:
33     - 10.240.0.0./24
34  usage:
35     egressCIDRUsage:
36     allocated: 2
37     total: 256
38     ingressCIDRUsage:
39     allocated: 3
40     total: 256
41  subnetCIDRUsage:
42     allocated: 24
43     total: 256
```

FIG. 8

Example of Error State

```
1  topology:
2      gateway: pending                                              902
3      ingressCIDRs:
4      egressCIDRs:
5      subnetCIDRs:
6      defaltEgressIP: pending
7      defaltIngressIP: null
8  usage:
9      ingressCIDRUsage:
10     allocated: 0
11     total: 254
12     egressCIDRUsage:
13     allocated: 0
14     total: 254
15     subnetCIDRUsage:
16     allocated: 0
17     total: 65536
18 status:
19     conditions:
20     - LastUpdateTime: "2021-04-08T06:29:30Z"
21     type: GatewayReady
22     reason: ResourceExhaustion
23     status: False
24     message: Failed to create gateway due to edge resource limit.
25     - LastUpdateTime: "2021-04-08T06:30:30Z"
26     type: LoadBalancerReady
27     reason: DependencyNotReady
28     status: False
29     message: Network resource not ready due to dependency errors
30     - LastUpdateTime: "2021-04-08T06:35:30Z"
31     type: NetworkConfigCompleted
32     reason: DependencyNotReady
33     status: False
34     message: Network not ready due to dependency errors
```

FIG. 9

USE OF CUSTOM RESOURCE DEFINITIONS FOR REPORTING NETWORK RESOURCE USAGE OF A NODE CLUSTER

CROSS-REFERENCE TO RELATED APPLICATIONS

This application claims priority to International Patent Application No. PCT/CN/2022/106711, filed Jul. 20, 2022, entitled "USE OF CUSTOM RESOURCE DEFINITIONS FOR REPORTING NETWORK RESOURCE USAGE OF A NODE CLUSTER", and assigned to the assignee hereof, the contents of each of which are hereby incorporated by reference in its entirety.

BACKGROUND

A container orchestrator such as Kubernetes is a system that deploys and manages applications written as microservices. A microservice of the application runs in a container, and one or more containers run in a pod. Kubernetes, for example, is implemented as a cluster of worker nodes, to which the pods are assigned to run, and a master node, which includes a software interface, called an application programming interface (API) server, to the external world. Kubernetes can run on any system, such as a public or private cloud, a data center, or a set of servers, by being allocated a set of resources from those systems. Resources needed by Kubernetes include an address space, storage, and networking. A namespace is a portion of the address space allocated to a portion of the Kubernetes system. In Kubernetes, pods are the unit of deployment, and the pods contain one or more containers and are assigned a network address for communication among pods.

A Software Defined Network (SDN) is a networking approach that separates a network's functions into a data plane, a control plane, and a management plane. The control plane controls the movement of data in the data plane, including via switches and routers, and can make a hierarchical arrangement of switches, routers, and gateways appear as a flat virtual network. The management plane manages the control plane and provides, among other items, security to the network.

To provide networking, such as SDN, for pods in a Kubernetes system, a network container plugin (NCP) is added to the management plane of the SDN and may run within a Kubernetes cluster. The Kubernetes system then uses the network's data plane and control plane to transfer data among the pods in the system so that the pods can interact to carry out their assigned microservices. However, a user has no direct way to monitor the usage of networks assigned to the pods and clusters without exposing internal network information, such as gateway identifiers.

Kubernetes allows users to define their own resources by defining a specification for a resource. Once the resource is specified and created, the Kubernetes system forces the state of the Kubernetes system to match the terms in the specification.

SUMMARY

One embodiment provides a method of capturing network usage for one or more namespaces. The method includes specifying, in a data structure, information to be captured for a network accessible by entities operating in the one or more namespaces, where the network includes a gateway and a set of routing addresses for access to and from the network. The network usage specifies how many routing addresses in the set of routing addresses are used. The method further includes providing the data structure to a node that controls the namespaces, and receiving a report of network usage from the node to satisfy the data structure.

Further embodiments include a computer-readable medium containing instructions that, when executed by a computing device, cause the computing device to carry out one more aspects of the above method and a system comprising a memory and a processor configured to carry out one or more aspects of the above method.

DETAILED DESCRIPTION

Communication among pods in a container orchestration system, such as a Kubernetes cluster, is usually required for the pods to carry out the micro applications assigned to them. Each pod has an assigned network address which allows access to the pod. Conventionally, a user has no direct way to monitor the usage of network resources assigned to the pods and clusters, such as how many network addresses are being used, without exposing internal network information, such as gateway identifiers.

Accordingly, as described herein, a custom resource is defined and added to a container orchestration system. The resource is called NetworkInfo and is instantiated into a ClusterNetworkInfo resource and a NameSpaceNetworkInfo resource. The ClusterNetworkInfo resource is a declarative structure that manages the reporting of network usage of the entire container orchestration system (e.g., for an entire Kubernetes cluster), while the NamespaceNetworkInfo resource is a declarative structure that manages the reporting of network usage of a particular namespace in the container orchestration system.

A master node of a supervisor cluster of the container orchestration system allows a user to set a period during which updates to the usage of resources specified in a ClusterNetworkInfo resource and a NameSpaceNetworkInfo resource occur. The user may determine the resource usage by inspecting the ClusterNetworkInfo and NamespaceNetworkInfo instances. As such, embodiments of the present disclosure allow a user to monitor usage of network resources assigned to pods and/or clusters of a container orchestration system without the need to expose internal network information.

Figure 1:
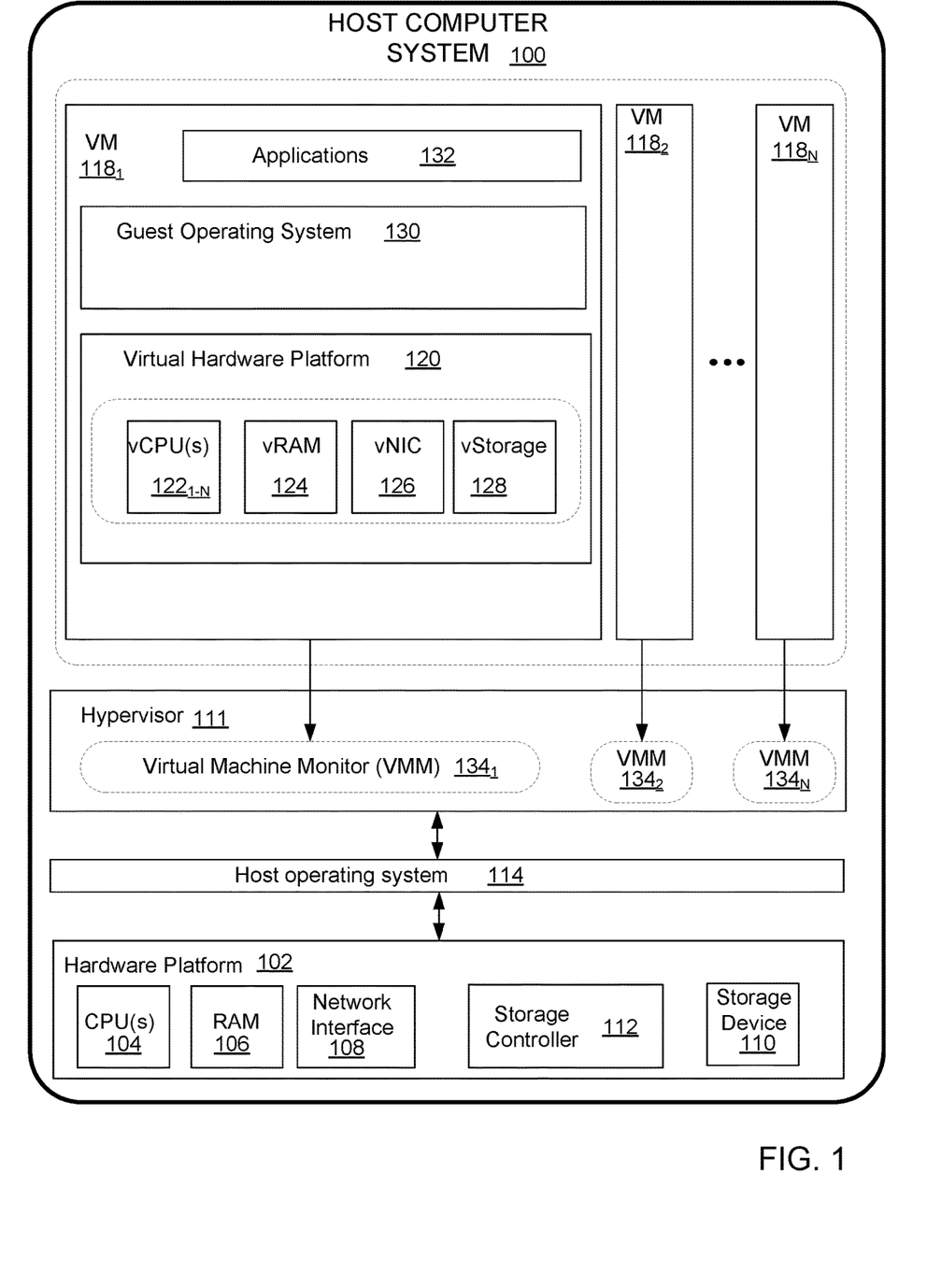
FIG. 1 depicts a block diagram of a host computer system 100 that is representative of a virtualized computer architecture.

FIG. 1 depicts a block diagram of a host computer system 100 that is representative of a virtualized computer architecture. As illustrated, host computer system 100 supports multiple virtual machines (VMs) $118_1$-$118_N$, an example of virtual computing instances that run on and share a common hardware platform 102. Hardware platform 102 includes conventional computer hardware components, such as random access memory (RAM) 106, one or more network interfaces 108, storage controller 112, persistent storage device 110, and one or more central processing units (CPUs) 104. Central processing units 104 may include processing units having multiple cores.

A virtualization software layer hereinafter referred to as a hypervisor 111, is installed on top of a host operating system 114, which itself runs on hardware platform 102. Hypervisor 111 makes possible the concurrent instantiation and execution of one or more virtual computing instances, such as VMs $118_1$-$118_N$. The interaction of a VM 118 with hypervisor 111 is facilitated by the virtual machine monitors (VMMs) $134_1$-$134_N$. Each VMM $134_1$-$134_N$ is assigned to and monitors a corresponding VM $118_1$-$118_N$. In one embodiment, hypervisor 111 may be ESXi available from VMware™ Inc. of Palo Alto, CA.

After instantiation, each VM $118_1$-$118_N$ encapsulates a virtual hardware platform 120 that is executed under the control of hypervisor 111. Virtual hardware platform 120 of VM $118_1$, for example, includes but is not limited to such virtual devices as one or more virtual CPUs (vCPUs) $122_1$-$122_N$, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of guest OS 130 include any of the well-known operating systems, such as the Microsoft Windows™ operating system, the Linux™ operating system, MAC OS, and the like.

Figure 2A:
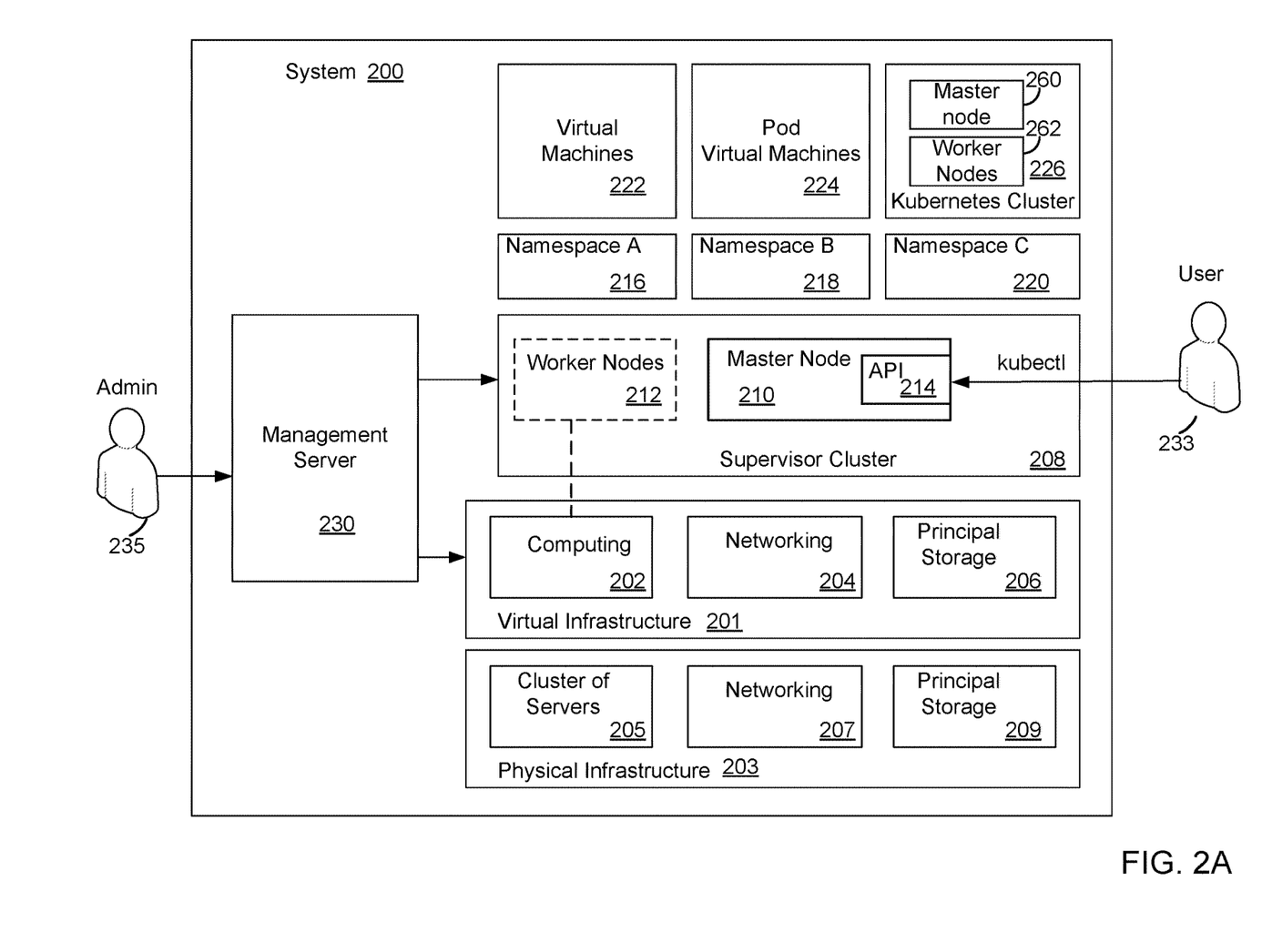
FIG. 2A depicts a system with a virtual machine, a pod virtual machine (pod VMs), and a Kubernetes cluster.

FIG. 2A depicts a system with a virtual machine, one or more pod virtual machines (pod VMs), and a Kubernetes cluster (which may be representative more generally of a container orchestration system). The system 200 includes a physical infrastructure 203 with a cluster of physical servers 205, networking resources 207, and principal storage 209. The physical infrastructure supports a virtual infrastructure 201 that includes virtual computing resources 202, virtual networking resources 204, and virtual principal storage 206. The virtual networking resource 204 provides a control plane and a management plane that controls a data plane in physical networking resources 207.

The system 200 also includes a Supervisor Cluster 208 that includes a set of worker nodes 212 and master node 210. The worker nodes 212 are provided by the computing resource 202 in the virtual infrastructure and perform the microservices of the application. The master node 210 includes authentication and authorization plugins, which are responsible for creating and managing Service Accounts. One type of authorization plugin is a role-based account access (RBAC) plugin. This type of plugin uses roles as the key factor in determining whether a user (or Service Account, see below) may perform an action or not. The user is associated with a role, and the role is allowed to perform certain actions on certain resources.

The master node also includes an API for access, via kubectl commands, to the master node by a user 233. The kubectl commands allow user 233 to access all parts of Supervisor Cluster 208 and the worker nodes 212. In addition, the API allows declarative manifests, often written in an object-based format such as YAML Ain't Markup Language (YAML) or JavaScript Object Notation (JSON), to be posted to create resources, change the operation, or collect information from the system 200.

A Service Account controls the resources that a pod has access to according to a namespace for the service account. A namespace allows a group of pods to access a set of resources, such as CPU, memory, and storage, assigned to the namespace and isolated from other namespaces. In some embodiments, the namespace is a local host namespace; in others, the namespace is a Kubernetes namespace. In the figure, virtual machines 222 reside in namespace A 216, pod virtual machines (further described in reference to FIG. 2B) reside in namespace B 218, while the Kubernetes cluster 226 (further described in reference to FIG. 2C), with its master node 260 and worker nodes 262, resides in namespace C 220. The virtual infrastructure 201 and the Supervisor Cluster 208 are controlled by a management server 230 to which an administrator 235 has access. The management server 230 allows the administrator to configure the physical infrastructure 203 and virtual infrastructure 201 of system 200.

Figure 2B:
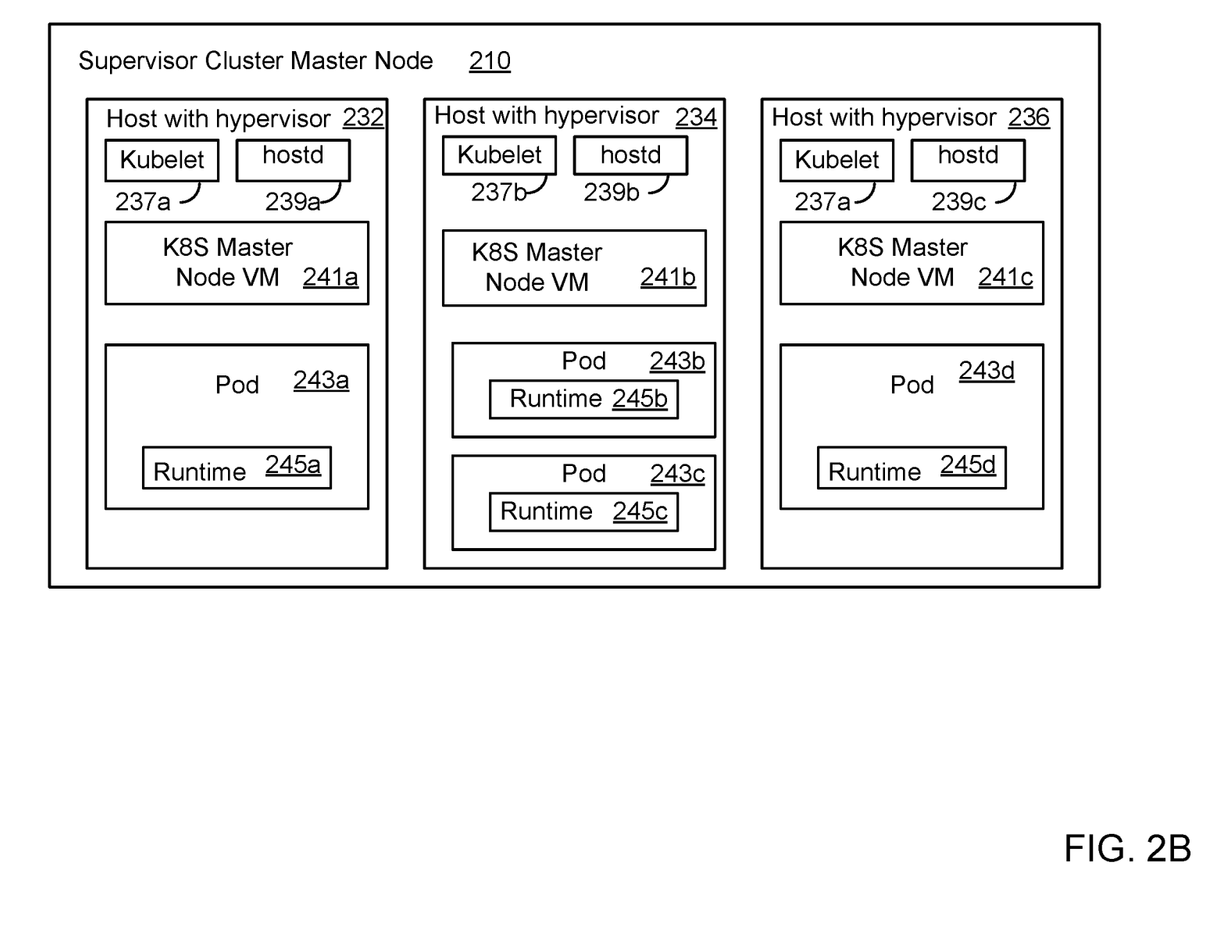
FIG. 2B depicts a supervisor cluster.

FIG. 2B depicts a supervisor cluster master node. The Supervisor Cluster master node 210 includes three host systems with hypervisors 232, 234, 236 that form a highly-available node. Each host with hypervisor 232, 234, 236 includes a Kubelet (or its equivalent) 237a-c, a host daemon service (hostd) 239a-c, a Kubernetes (K8s) master node virtual machine 241a-c, and one or more pods 243a-d, each of which has its own runtime 245a-d. The Kubelet or its equivalent 237a-c allows the host to join Supervisor Cluster 208. The master node virtual machine 241a-c runs an API server, a database, a scheduler, and a controller manager, which are all part of a Kubernetes master node 210.

Figure 2C:
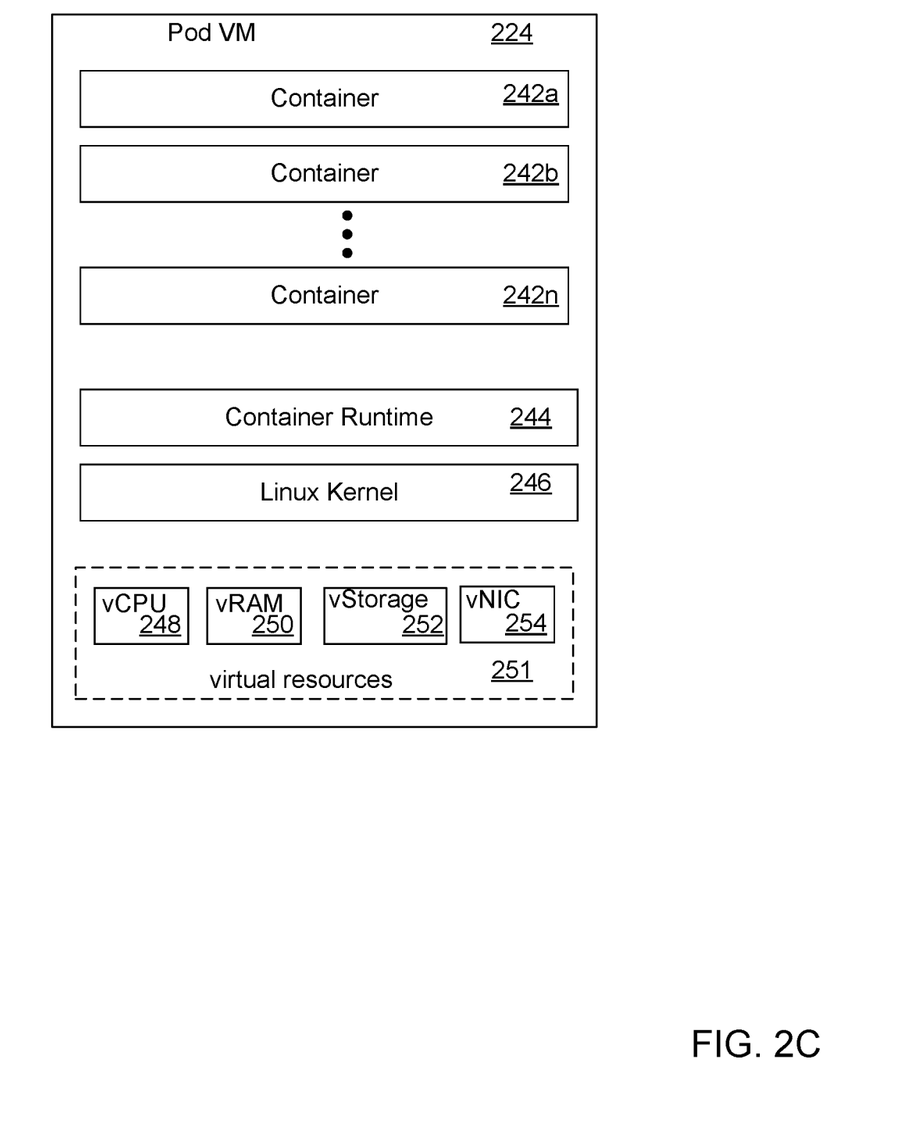
FIG. 2C depicts a pod VM.

FIG. 2C depicts a pod VM. The pod VM has access to virtual resources 251, which include virtual CPU 248 (a compute resource), virtual RAM 250, virtual storage 252, and a virtual network interface controller (vNIC) 254. The pod VM 224 also includes one or more Linux kernels 246 and container runtimes 244 running a set of containers 242a-n.

Figure 2D:
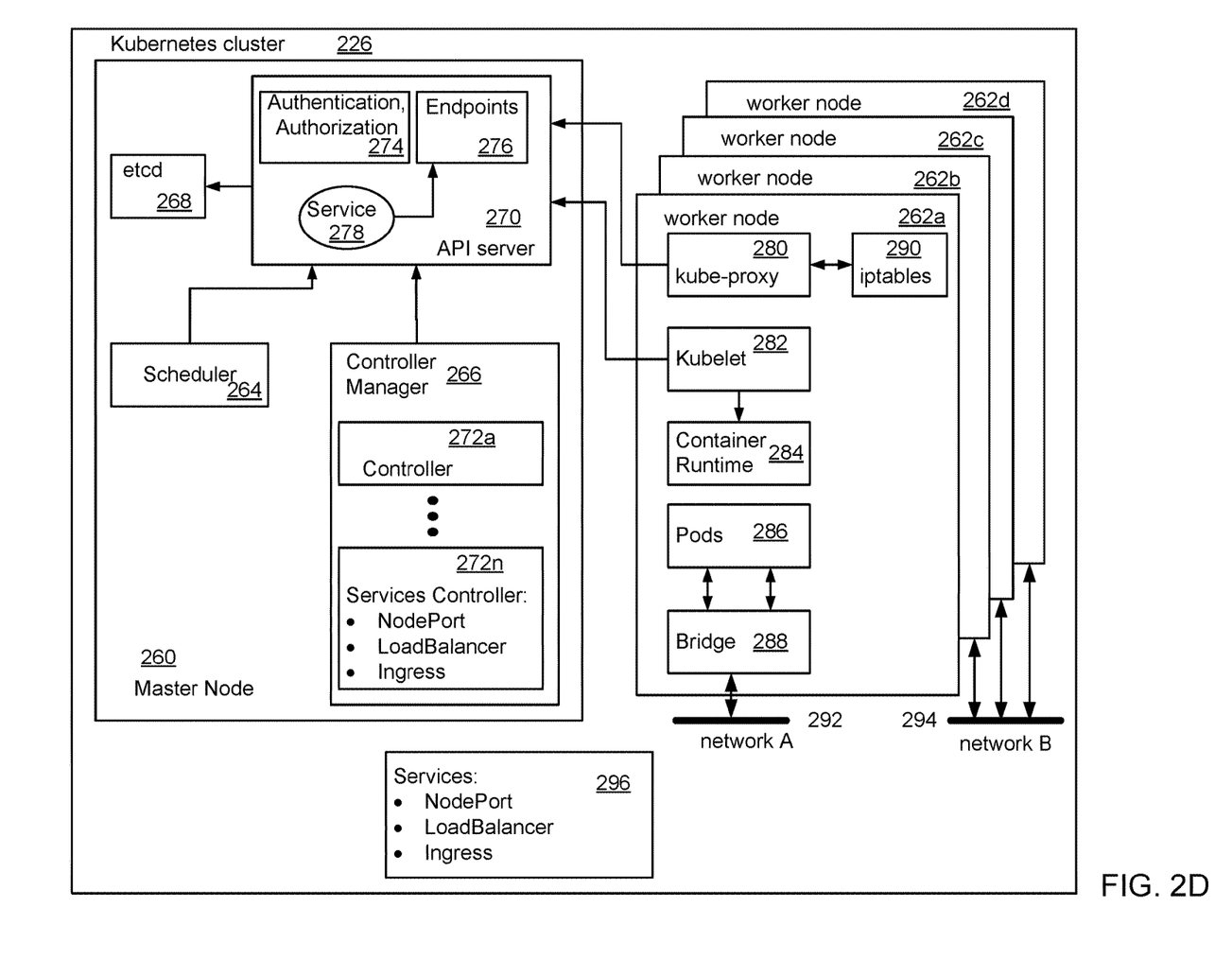
FIG. 2D depicts a Kubernetes cluster.

FIG. 2D depicts a Kubernetes cluster. The cluster includes a master node 260 and a set of worker nodes 262a-d. The master node 260 includes an API server 270, a scheduler 264, a controller manager 266, and a distributed data store called etcd 268. The API server 270 includes one or more services 278 and one or more endpoints 276. Services are resource objects that provide stable network connections to pods, and endpoints are resource objects that contain a list of network addresses and ports that expose an associated service to entities outside a Kubernetes cluster 226. The Controller manager 266 includes one or more controllers 272a-272n, some of which are services controllers, such as controllers for a NodePort service, LoadBalancer service, and Ingress service. The NodePort, LoadBalancer, and Ingress services 296 expose pods to an entity outside the cluster. The Ingress Services controller is a replication controller that forwards traffic to a set of pods.

The worker nodes 262a-d include a kube-proxy, iptables 290, a Kubelet 282, a container runtime 284, such as Docker, a set of pods 286, and a network bridge 288. The scheduler 264 assigns pods 286 to the worker nodes 262a-d for execution.

The API server 270 provides the create, read, update, and delete interface for querying and modifying the cluster state. It stores the state in the etcd data store 268. The API server 270 has a watch service. Every time an object is updated, the API server sends the new version of the object to each entity, such as a controllers 272*a-n*, watching the object.

The scheduler 264 waits for newly created pods through the API server's watch mechanism and assigns a node to each new pod. The scheduler updates the pod definition and then notifies the Kubelet 282 that the pod has been scheduled. When the Kubelet 282 sees that the pod has been scheduled to its node, it creates and runs the pod's containers.

The controller manager 266 watches the API server 270 for changes to resources, such as Deployments and Services, and performs operations for each change. Such operations include the creation of a new object, update or deletion of an existing object, creation of other resources, or updates to watched resources.

Controllers 272*a-n* run a reconciliation loop, which forces the actual state to match the desired state specified in the resource's specification, usually in the form of a set of declarations. Controllers 272*a-n* use the watch service to be notified of changes. Each controller connects to the API server 270 and, through the watch service, asks to be notified when a change occurs to a set of resources for which the controller is responsible. If a change occurs that causes a mismatch between the declarative specification and the current condition of the resource, the controller acts to correct the mismatch. Controllers include a Replication Manager, a ReplicaSet controller, a DaemonSet controller and Job controller, a Deployment controller, a Statefulset controller, a Node controller, a Services controller, an Endpoints controller, a Namespace controller, and a Persistent Storage Volume controller. Each Services controller gets its own stable virtual IP address and port.

The etcd 268 is a fast, distributed, consistent key-value store for storing the cluster state and metadata.

The Kubelet 282 runs on worker nodes 262*a-d* and is responsible for everything running on the worker node 262*a-d*. It registers the node on which it is running by creating a node resource in the API server 270. It continuously monitors the API server 270 for pods scheduled to the node and starts the pod's containers by telling the container runtime 284 to run a container from a specific container image. The Kubelet 282 monitors the running containers and reports their status, events, and resource consumption to the API server 270.

The kube-proxy 280 ensures that clients can connect to the services defined through the API server. The kube-proxy 280 ensures connections to the Service IP and port end up at one of the pods backing the service. The kube-proxy makes a service available on the node it runs on by setting up rules in the iptables 290, where the rules assure that each packet destined for the service IP and port pair is intercepted and its address modified so that the packet is redirected to one of the pods backing the service.

A pod 286 is a structure that holds one or more containers. Each pod 286 gets a unique IP address and can communicate with other pods through a flat network without network address translation. A bridge 288 resides on a node 262*a-d* and connects a pod's IP address to a network. When nodes are connected to a complex network with switches and routers, a software-defined network (SDN) makes the nodes appear as though they are connected to the same network switch. For example, the control plane in SDN makes it appear that network A 292 and network B 294 are connected even when they are physically different networks.

Figure 3:
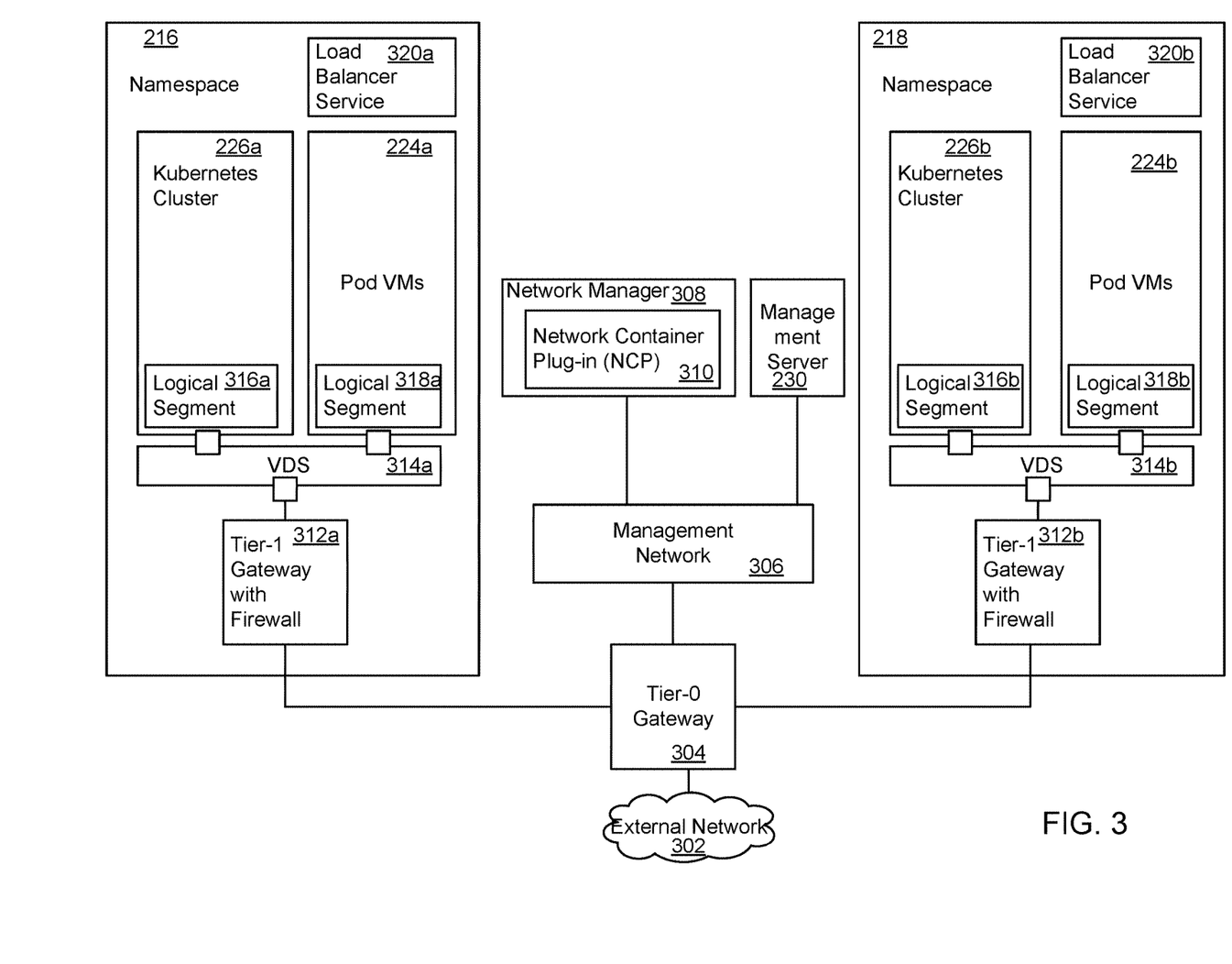
FIG. 3 depicts a vSphere architecture with details of the networking system.

FIG. 3 depicts a system architecture with details of the networking system. The networking includes a Tier-0 gateway 304 that connects internal Tier-1 gateways 312*a, b* (e.g., that are internal to a data center) and a management network 306 to an external network 302 (e.g., that is outside the data center). The management network is a separate network on which the network manager and management server reside. Tier-0 gateway 304 is present to provide routing to the external network 302. The Tier-1 gateways 312*a,b* provide access to the namespaces and a load balancer 320*a,b* for each namespace 216, 218, respectively.

Each Tier-1 gateway 312*a,b* includes a firewall or portion of a distributed firewall (DFW). Each Tier-1 gateway 312*a,b* is also connected to a port of a virtual distributed switch (VDS) 314*a,b*, respectively, to which logical segments 316*a, b*, 318*a,b* respectively of the local network are connected via ports. One logical segment 316*a,b* connects to a Kubernetes cluster 226*a,b* respectively, and another logical segment 318*a,b* connects to pod VMs 224*a,b* respectively. The firewalls in the gateways enforce network access to and from the pods accessible by the gateways.

Figure 4:
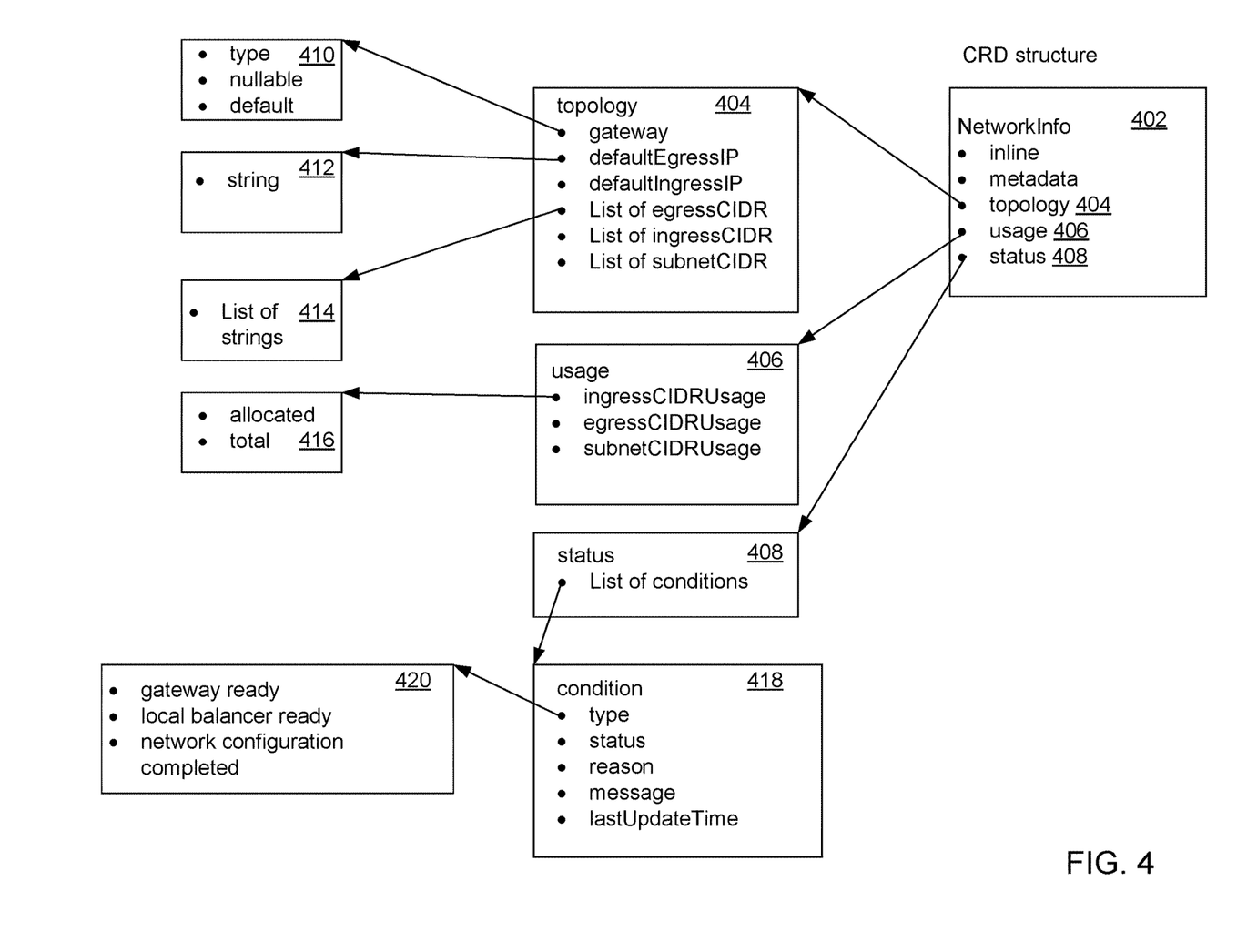
FIG. 4 depicts a set of data structures for capturing the usage of networks within the architecture, in an embodiment.

FIG. 4 depicts a set of data structures for capturing the usage of networks within the architecture, in an embodiment. The top-level structure 402 is the network information structure (NetworkInfo). The NetworkInfo structure 402 includes an inline field, a metadata field, a topology field, a usage field, and a status field. The inline and metadata fields are metadata for the structure.

The topology field 404 describes the topology of a network as a gateway, a default egress IP address, a default ingress IP address, a list of egress CIDRs, a list of ingress CIDRs, and a list of subnet CIDRs, where a CIDR is a classless interdomain routing address, each having the form of a.b.c.d/x, where x is a number of bits in the first part of the address (e.g., a subnet prefix). The gateway has type, nullable, and default fields 410. The defaultEgressIP and default Ingress IP are strings 412. The List of egressCIDS and List of ingressCIDRs are lists of strings 414. The ingress and egress IP addresses and CIDRs give network information for accessing resources in a namespace. For example, the addresses describe the networks for accessing and receiving information from Pod VM 224 or Kubernetes Cluster 226.

The usage field 406 describes how many networks in the topology of the network are used by providing the ingress CIDR usage, the egress CIDR usage, and the subnet CIDR usage to the resource in a namespace. All of the usage fields 406 have an allocated and total field 416.

The status field 408 provides a list of conditions regarding a network resource. The condition fields 418 include a type, a status, a reason, a message, and a last update timestamp. Type field provides the type of condition 418, which includes GatewayReady, LoadBalancerReady, and network_config_completed as shown in structure 420. The status provides a Boolean variable indicating whether the condition is met. The reason field summarizes the cause of a negative status. The message field gives a user a readable message for the negative status.

Figure 5:
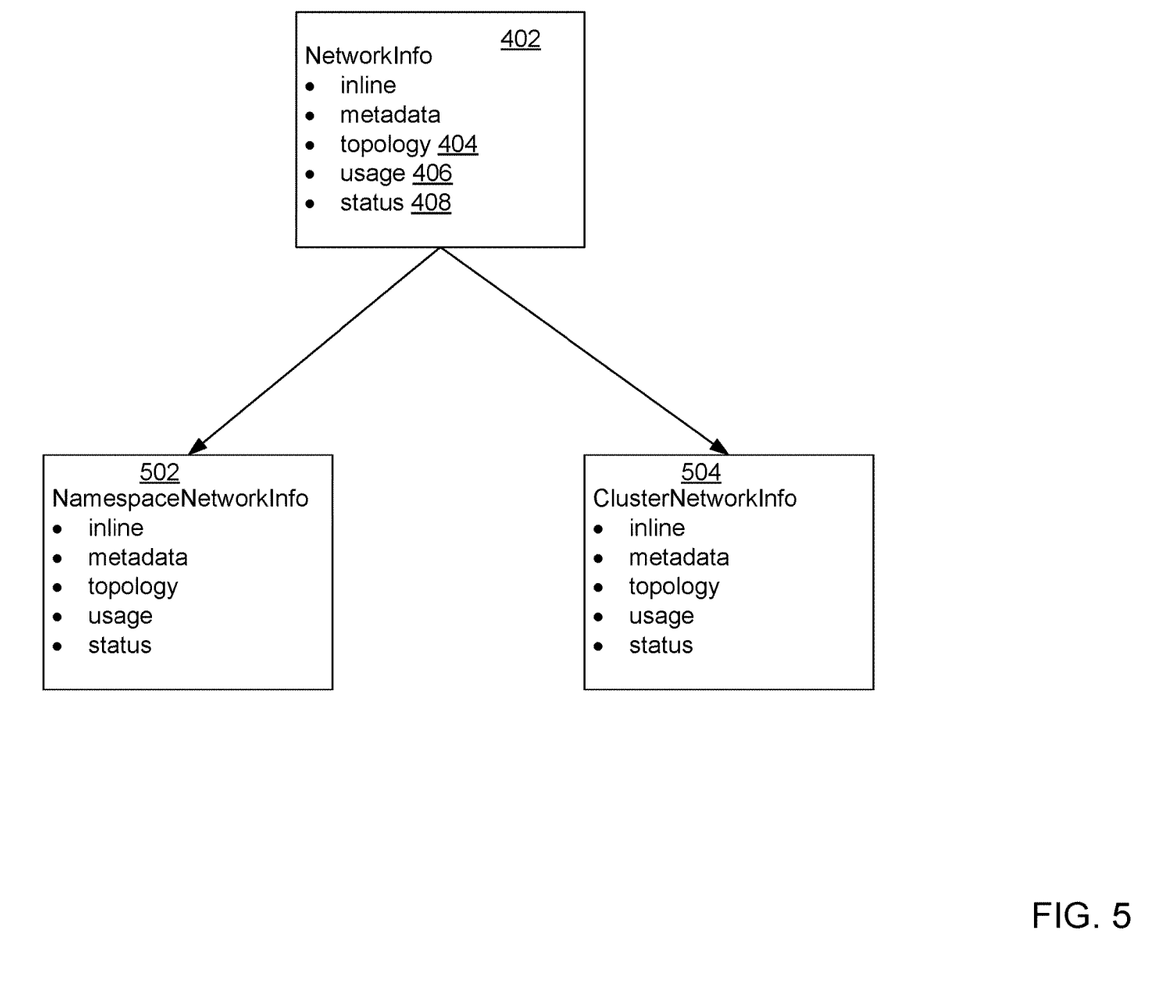
FIG. 5 depicts instances of the structures in FIG. 4, in an embodiment.

FIG. 5 depicts instances of the structures in FIG. 4, in an embodiment. One of the instances 502 is a NamespaceNetworkInfo structure, and the other instance 504 is a ClusterNetworkInfo structure. The scope of the NamespaceNetworkInfo structure is only one of the namespaces, whereas the ClusterNetworkInfo structure covers the entire cluster.

Figure 6:
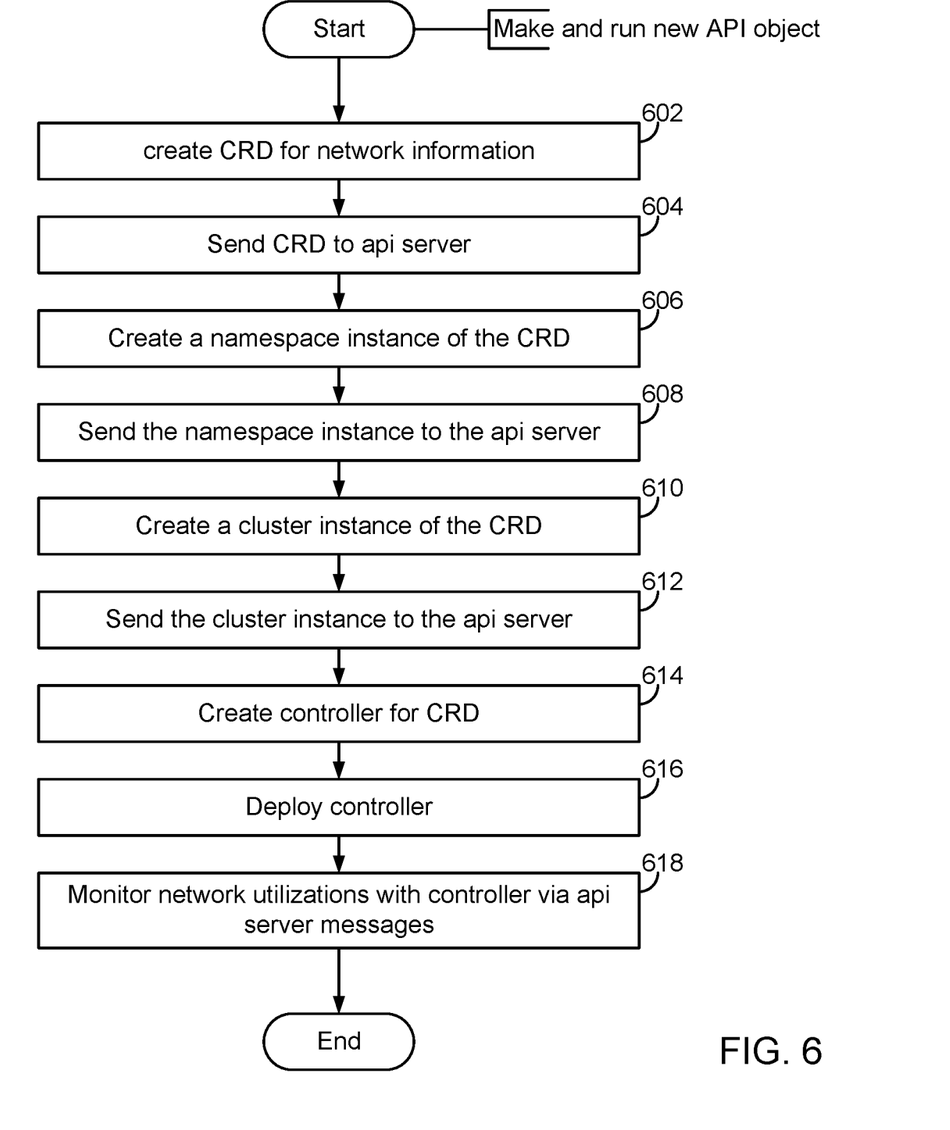
FIG. 6 depicts a flow of operations for making and running a CRD.

FIG. 6 depicts a flow of operations for making and running a CRD. In step 602, the user creates a CRD for acquiring network information. In step 604, user 233 sends the CRD to the API server 270 in the master node 210 of the Supervisor Cluster 208. In step 606, the user 233 creates a namespace instance, NamespaceNetworkInfo 502 of the CRD. In step 608, the user 233 sends the namespace instance to the API server 270. In step 610, the user 233 creates a cluster instance, ClusterNetworkInfo 504, of the CRD. In step 612, the user 233 sends the cluster instance to the API server 270. In step 614, the user creates a controller in the master node 210 for the CRD. The CRD controller is a software component that implements the gathering of information specified in either the NamespaceNetworkInfo CRD or the ClusterNetworkInfo CRD over a specified time period. In step 616, the user deploys the controller to the master node 210. In step 618, the controller monitors utilizations via messages received from the API server 270 and gathers the specified information. A user 233 can access the gathered information via a kubectl command to the API server 270.

Figure 7:
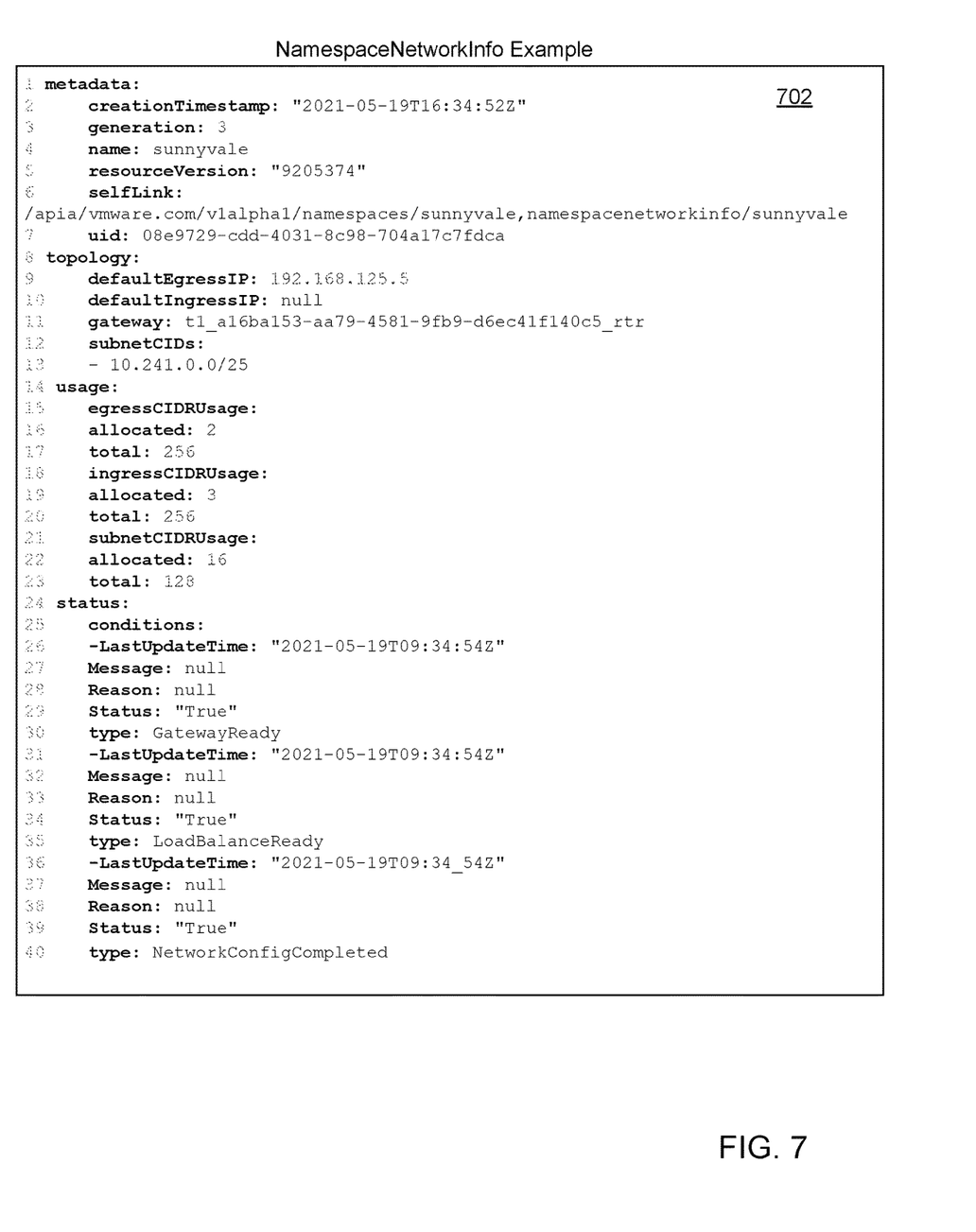
FIG. 7 depicts an example of the namespace network information structure, in an embodiment.

FIG. 7 depicts an example of the namespace network information structure, in an embodiment. The NamespaceNetworkInfo structure 702 includes specific values for the topology (line 8), usage (line 14), and status fields (line 24). Not all of the fields of the NetworkInfo structure 402 need to be present. The topology field indicates a default egress IP, a gateway, and a subnet for the namespace controlled by gateway 312a,b. The usage field indicates that 2 egress CIDRs are used, 3 ingress CIDRs are used, and 16 subnet CIDRs are used for the namespace controlled by gateway 312a,b. The status field indicates that no error conditions are present.

Figure 8:
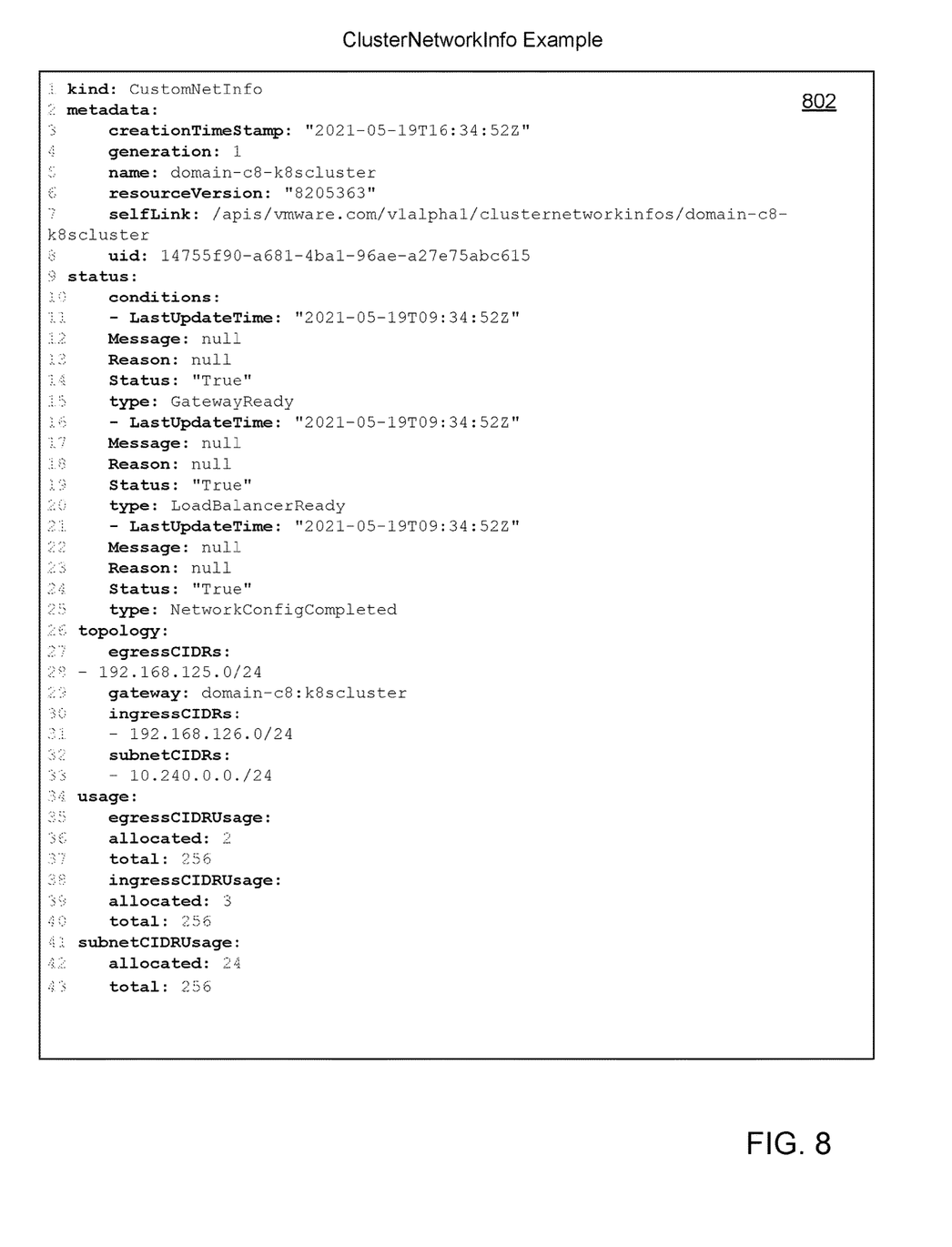
FIG. 8 depicts an example of the cluster network information structure, in an embodiment.

FIG. 8 depicts an example of the cluster network information structure, in an embodiment. The ClusterNetworkInfo structure 802 provides specific values for topology (line 26), usage (line 34), and status (line 9) fields of an entire cluster (i.e., all of the namespaces provisioned by the Supervisor Cluster 208. The topology indicates an egress, a gateway, an ingress, and a subnet for the entire cluster, which is controlled by gateways 312a,b. Usage indicates that 2 egress CIDRs are allocated, 3 ingress CIDRs are allocated, and 24 subnet CIDRs are allocated for access to all of the namespaces of the system 216, 218.

Figure 9:
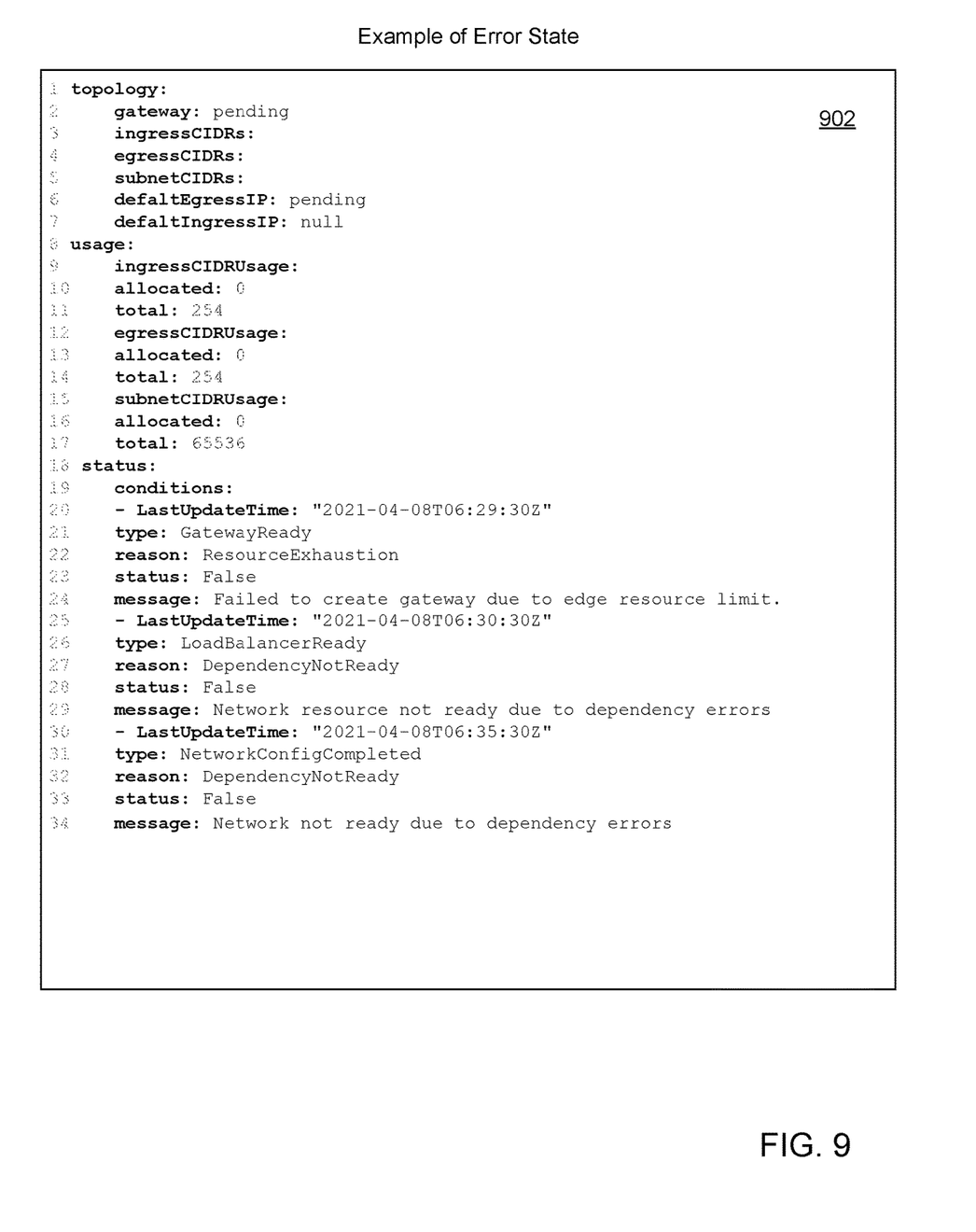
FIG. 9 depicts an example of an error condition reported in the network information structure, in an embodiment

FIG. 9 depicts an example of an error state reported in the network information structure, in an embodiment. The error state 902 is reported in the status field (line 18) along with a timestamp for the condition. In this example, the condition of GatewayReady is false (Line 23), the condition of LoadBalancerReady is false (Line 28), and the condition of NetworkConfigCompleted is false (Line 33). Each false condition has a reason and an accompanying message as depicted.

Embodiments of the present disclosure constitute an improvement to the technical field of container orchestration system management by allowing users to access network resource utilization information related to clusters and/or namespaces in a configurable manner without the need to expose internal network configuration information such as gateway identifiers. For example, techniques described herein may allow a developer to analyze network resource usage information in a secure manner, such as to identify and address errors related to network connectivity within a container orchestration system.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments of the invention may be helpful to machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations, including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data, which can thereafter be input to a computer system—computer-readable media may be based on any existing or subsequently developed technology for embodying computer programs in a manner that enables them to be read by a computer. Examples of a computer-readable medium include a hard drive, network-attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation unless explicitly stated in the claims.

Virtualization systems, in accordance with the various embodiments, may be implemented as hosted embodiments, non-hosted embodiments, or as embodiments that tend to blur distinctions between the two. Furthermore, various virtualization operations may be wholly or partially implemented in hardware. For example, a hardware implementation may employ a look-up table for modification of storage access requests to secure non-disk data.

Certain embodiments, as described above, involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. Using OS-less containers allows resources to be isolated, services restricted, and processes provisioned to have a private view of the operating system with their own process ID space, file system structure, and network interfaces. Multiple containers can share the same kernel, but each container can be constrained only to use a defined amount of resources such as CPU, memory, and I/O. The term "virtualized computing instance," as used herein, is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of capturing network usage for one or more namespaces, the method comprising:
    specifying, in one or more custom resource definitions, information to be captured for a network accessible by entities operating in the one or more namespaces, wherein the network includes a gateway and a set of routing addresses for access to and from the network, and wherein the network usage specifies how many routing addresses in the set of routing addresses are used;
    providing the one or more custom resource definitions to a management interface in a node that controls the one or more namespaces, wherein the management interface provides create, read, update, and delete operations for one or more of the entities operating in the one or more namespaces;
    collecting, by one or more controllers in the node, network usage information according to the information specified in the one or more custom resource definitions, from notifications received from the management interface, wherein the management interface is configured to send notifications to the one or more controllers when changes are detected to the network; and
    receiving a report of network usage from the node according to the information specified in the one or more custom resource definitions to be captured.

2. The method of claim 1, wherein the node is a master node in a supervisor cluster supporting the one or more namespaces and the management interface is an application programming interface (API) that receives the one or more custom resource definitions.

3. The method of claim 1, wherein a pod virtual machine is an entity operating in the one or more namespaces.

4. The method of claim 1, wherein the one or more namespaces are associated with a cluster of nodes that implement a container orchestration system.

5. The method of claim 1, wherein the one or more custom resource definitions includes a status field for indicating any error condition applying to the network.

6. The method of claim 1, further comprising providing a controller that resides in the node, wherein the controller performs a watch service for the information specified to be captured.

7. The method of claim 1, wherein the report of network usage does not reveal any other information about the network.

8. A system comprising:
    a CPU coupled to a memory;
    a cluster of servers, the cluster being configured to run a node that controls one or more namespaces, wherein the servers are communicatively connected to the CPU and the memory; and
    a networking sub-system coupled to the cluster of servers, the networking sub-system accessible by entities operating in the one or more namespaces;
    wherein one or more custom resource definitions are provided to a management interface in the node, the one or more custom resource definitions being configured to: specify information to be captured for the networking sub-system accessible by the one or more namespaces,
    wherein the network includes a gateway and a set of routing addresses for access to and from the network,
    wherein the network usage specifies how many routing addresses in the set of routing addresses are used,
    wherein one or more controllers in the node collect network usage information according to the information specified in the one or more custom resource definitions, from notifications received from the management interface, wherein the management interface is configured to send notifications to the one or more controllers when changes are detected to the networking sub-system and wherein the management interface provides create, read, update, and delete operations for one or more of the entities operating in the one or more namespaces, and
    wherein the node provides a report of network usage according to the information specified in the one or more custom resource definitions to be captured.

9. The system of claim 8, wherein the node is a master node in a supervisor cluster supporting the one or more namespaces and the management interface is an application programming interface (API) that receives the one or more custom resource definitions.

10. The system of claim 8, wherein a pod virtual machine is an entity operating in one of the one or more namespaces.

11. The system of claim 8, wherein the one or more namespaces are associated with a cluster of nodes that implements a container orchestration system.

12. The system of claim 8, wherein the one or more custom resource definitions includes a status field for indicating any error condition applying to the network.

13. The system of claim 8, wherein the node includes a controller, and the controller performs a watch service for the information specified to be captured.

14. The system of claim 8, wherein the report of network usage does not reveal any other information about the network.

15. A non-transitory computer-readable medium comprising instructions, which, when executed, cause a computer system to carry out a method for capturing network usage for one or more namespaces accessible by entities operating in the one or more namespaces, the method comprising:

specifying, in one or more custom resource definitions, information to be captured for a network accessible by the one or more namespaces, wherein the network includes a gateway and a set of routing addresses for access to and from the network, and wherein the network usage specifies how many routing addresses in the set of routing addresses are used;

providing the one or more custom resource definitions to a management interface in a node that controls the one or more namespaces, wherein the management interface provides create, read, update, and delete operations for one or more of the entities operating in the one or more namespaces;

collecting, by one or more controllers in the node, network usage information according to the information specified in the one or more custom resource definitions, from notifications received from the management interface, wherein the management interface is configured to send notifications to the one or more controllers when changes are detected to the network; and receiving a report of network usage from the node according to the information specified in the one or more custom resource definitions to be captured.

16. The non-transitory computer-readable medium of claim 15, wherein the node is a master node in a supervisor cluster supporting the one or more namespaces and the management interface is an application programming interface (API) that receives the one or more custom resource definitions.

17. The non-transitory computer-readable medium of claim 16, wherein a pod virtual machine is an entity operating in the one or more namespaces.

18. The non-transitory computer-readable medium of claim 16, wherein the one or more namespaces are associated with a cluster of nodes that implement a container orchestration system.

19. The non-transitory computer-readable medium of claim 16, wherein the one or more custom resource definitions includes a status field for indicating any error condition applying to the network.

20. The non-transitory computer-readable medium of claim 16, wherein the report of network usage does not reveal any other information about the network.

* * * * *